United States Patent
Muff et al.

(10) Patent No.: US 9,594,557 B2
(45) Date of Patent: *Mar. 14, 2017

(54) FLOATING POINT EXECUTION UNIT FOR CALCULATING PACKED SUM OF ABSOLUTE DIFFERENCES

(71) Applicant: International Business Machines Corporation, Armonk, NY (US)

(72) Inventors: Adam J. Muff, Issaquah, WA (US); Paul E. Schardt, Rochester, MN (US); Robert A. Shearer, Woodinville, WA (US); Matthew R. Tubbs, Issaqhah, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/074,378

(22) Filed: Mar. 18, 2016

(65) Prior Publication Data

US 2016/0202974 A1    Jul. 14, 2016

Related U.S. Application Data

(63) Continuation of application No. 14/838,105, filed on Aug. 27, 2015, which is a continuation of application No. 13/688,562, filed on Nov. 29, 2012.

(51) Int. Cl.
*G06F 9/30* (2006.01)
*G06F 9/38* (2006.01)
(Continued)

(52) U.S. Cl.
CPC .............. *G06F 9/3001* (2013.01); *G06F 7/00* (2013.01); *G06F 7/483* (2013.01); *G06F 7/50* (2013.01);
(Continued)

(58) Field of Classification Search
CPC ...... G06F 7/50; G06F 9/30036; G06F 9/3885; G06F 9/3887; G06F 9/3893; G06F 2207/3828; G06F 2207/5442
See application file for complete search history.

(56) References Cited

U.S. PATENT DOCUMENTS 7,054,895 B2    5/2006   Koba et al.
7,376,686 B2    5/2008   Johnson et al.
(Continued)

OTHER PUBLICATIONS

K. Diefendorff, "Pentium III = Pentium II + SSE", Microprocessor Report, 1999.*

(Continued)

*Primary Examiner* — Matthew Sandifer
(74) *Attorney, Agent, or Firm* — Middleton Reutlinger

(57) ABSTRACT

A method provides support for packed sum of absolute difference operations in a floating point execution unit, e.g., a scalar or vector floating point execution unit. Existing adders in a floating point execution unit may be utilized along with minimal additional logic in the floating point execution unit to support efficient execution of a fixed point packed sum of absolute differences instruction within the floating point execution unit, often eliminating the need for a separate vector fixed point execution unit in a processor architecture, and thereby leading to less logic and circuit area, lower power consumption and lower cost.

18 Claims, 7 Drawing Sheets

(51) Int. Cl.
*G06F 7/00* (2006.01)
*G06F 7/50* (2006.01)
*G06F 7/483* (2006.01)
*G06F 7/544* (2006.01)

(52) U.S. Cl.
CPC .......... *G06F 7/544* (2013.01); *G06F 9/30036* (2013.01); *G06F 9/30145* (2013.01); *G06F 9/3887* (2013.01); *G06F 9/3895* (2013.01); *G06F 2207/5442* (2013.01)

(56) References Cited

U.S. PATENT DOCUMENTS

| | | | |
|---|---|---|---|
| 7,516,307 | B2 | 4/2009 | Abdallah et al. |
| 2006/0149803 | A1 | 7/2006 | Siu et al. |
| 2009/0150647 | A1 | 6/2009 | Mejdrich et al. |
| 2014/0019713 | A1* | 1/2014 | Ould-Ahmed-Vall .. G06F 15/78 712/4 |

OTHER PUBLICATIONS

J. Keshava and V. Pentkovski, "Pentium III Processor Implementation Tradeoffs," Intel Technology Journal, Quarter 2, 1999.*
Intel Architecutre Software Developer's Manual, vol. 2: Instruction Set Reference Manual, 1999, pp. 1.1-1.9, 3.545-3547, B35.
S. K. Raman, V. Penkovski and J. Keshava, "Implementing streaming SIMD extensions on the Pentium III processor", IEEE Micro, vol. 20, No. 4, pp. 47-57, 2000.
U.S Patent and Trademark Office, Office Action issued in related U.S. Appl. No. 13/688,562 dated Sep. 25, 2015.
U.S. Patent and Trademark Office, Notice of Allowance issued in related U.S. Appl. No. 13/688,562 dated Jan. 8, 2016.
U.S. Patent and Trademark Office, Office Action issued in related U.S. Appl. No. 14/838,105 dated Sep. 25, 2015.
U.S. Patent and Trademark Office, Notice of Allowance issued in related U.S. Appl. No. 14/838,105 dated Jan. 11, 2016.
U.S. Patent and Trademark Office, Office Action issued in related U.S. Appl. No. 15/074,346 dated May 19, 2016.
U.S. Patent and Trademark Office, Notice of Allowance issued in related U.S. Appl. No. 15/074,346 dated Sep. 7, 2016.

* cited by examiner

| 1 | 8 | 31 |
|---|---|---|
| Ax Sgn | AxExp | AxFrac |

FIG. 7

| 7 | 15 | 23 | 31 |
|---|---|---|---|
| Ax0 | Ax1 | Ax2 | Ax3 |

FIG. 8

FLOATING POINT EXECUTION UNIT FOR CALCULATING PACKED SUM OF ABSOLUTE DIFFERENCES

FIELD OF THE INVENTION

The invention is generally related to data processing, and in particular to processor architectures and floating point execution units incorporated therein.

BACKGROUND OF THE INVENTION

Modern computer processor architectures typically rely on multiple functional units to execute instructions from a computer program. An instruction or issue unit typically retrieves instructions and dispatches, or issues, the instructions to one or more execution units to handle the instructions. A typical computer processor may include, for example, a load/store unit that handles retrieval and storage of data from and to a memory, and a fixed point execution unit, or arithmetic logic unit (ALU), to handle logical and arithmetic operations.

Whereas earlier processor architectures utilized a single ALU to handle all logical and arithmetic operations, demands for increased performance necessitated the development of superscalar architectures that utilize multiple execution units to handle different types of computations. Doing so enables multiple instructions to be routed to different execution units and executed in parallel, thereby increasing overall instruction throughput.

One of the most common types of operations that can be partitioned into a separate execution unit is floating point arithmetic. Floating point calculations involve performing mathematical computations using one or more floating point values. A floating point value is typically represented as a combination of an exponent and a significand. The significand, which may also be referred to as a fraction or mantissa, represents the digits in a floating point value with a predetermined precision, while the exponent represents the relative position of the binary point for the floating point value. A floating point execution unit typically includes separate exponent and significand paths, with a series of adders incorporated into the exponent path to calculate the exponent of a floating point result, and a combination of multiplier, alignment, normalization, rounding and adder circuitry incorporated into the significand path to calculate the significand of the floating point result.

Floating point execution units may be implemented as scalar execution units or vector execution units. Scalar execution units typically operate on scalar floating point values, while vector execution units operate on vectors comprising multiple scalar floating point values. Vector floating point execution units have become popular in many 3D graphics hardware designs because much of the data processed in 3D graphics processing is readily vectorizable (e.g., coordinates of objects in space are often represented using 3 or 4 floating point values).

When a separate floating point execution unit is utilized in a computer processor, other arithmetic and logical operations are typically handled in a smaller, less complex fixed point execution unit. Fixed point arithmetic, in contrast with floating point arithmetic, presumes a fixed binary point for each fixed point value. Arithmetic operations are typically performed more quickly and with less circuitry than required for floating point execution units, with the tradeoff being reduced numerical precision. Floating point operations can also be compiled into multiple fixed point operations capable of being executed by a fixed point execution unit; however, a floating point execution unit often performs the same operations much more quickly and using less instructions, so the incorporation of a floating point execution unit into a processor often improves performance for many types of computationally-intensive workloads.

Most high performance processors have therefore migrated to an architecture in which both fixed point and floating point execution units, and in some instances, both scalar and vector fixed point and/or floating point execution units, are incorporated into the same processor, thereby enabling a processor to optimally handle many different types of workloads. For other types of computer processors such as mobile processors, embedded processors, low power processors, etc., however, the inclusion of multiple execution units may be problematic, often increasing cost and requiring excessive circuitry and power consumption.

Nonetheless, a number of different types of calculations still present performance problems for conventional processors. For example, image recognition is fast becoming an important feature in many computer applications. Image recognition, however, often requires substantial processing power, and as a result, the implementation of high performance image recognition algorithms can be a challenge, particularly for mobile devices and other low power devices where power consumption and costs can be paramount concerns.

One commonly used operation used in many image recognition algorithms, for example, is a packed sum of absolute differences operation. A sum of absolute differences algorithm, for example, may be used to measure the similarity between image blocks by taking the absolute difference between corresponding pixels in two blocks being compared with one another. The differences are then summed to create an indication of block similarity.

The "packed" in a packed sum of absolute differences operation refers to how colors are stored in a packed format in memory. A common format is R8G8B8A8, which is 32 bits per pixel, where there is 8 bits for the red channel, 8 bits for the green channel, 8 bits for the blue channel, and 8 bits for the alpha channel (typically a transparency mask). Images are often loaded from memory in packed format, then converted to floating point where high precision algorithms can be performed (e.g., filtering), with the results converted back to a packed format and stored back to memory. Where a processor architecture supports a packed sum of absolute differences operation, however, the sum of absolute differences is calculated while the data is still in a packed format, thereby eliminating the need to first convert the data to floating point and then re-pack, often yielding a substantial performance improvement.

Packed sum of absolute differences operations may be supported in a processor architecture using a dedicated vector fixed point instruction, which may be executed in a single pipeline pass using a vector fixed point execution unit. However, some processor architectures may only have a scalar fixed point and/or scalar floating point execution unit, or may only have a vector floating point execution unit. Alternatively, in some processor architectures, a vector fixed point execution unit may be included, but for performance concerns, a second vector fixed point execution unit may also be needed to ensure that dual instruction issue can be performed. Therefore, in all of these cases, additional circuit area is typically required to support packed sum of absolute differences instructions, which necessarily increases power consumption and chip cost, often precluding many processor designs from incorporating native support for packed sum of absolute differences operations.

A need therefore continues to exist in the art for an improved manner of efficiently and cost-effectively handling packed sum of absolute differences operations in a processor architecture.

SUMMARY OF THE INVENTION

The invention addresses these and other problems associated with the prior art by providing a method that provides support for packed sum of absolute difference operations in a floating point execution unit, e.g., a scalar or vector floating point execution unit. In many embodiments consistent with the invention, existing adders in a floating point execution unit may be utilized along with minimal additional logic in the floating point execution unit to support efficient execution of a fixed point packed sum of absolute differences instruction within the floating point execution unit. Doing so may eliminate the need for a separate vector fixed point execution unit in a processor architecture, thereby leading to less logic, lower power consumption and lower cost.

Therefore, consistent with one aspect of the invention, a method of performing a packed sum of absolute differences operation includes, in a processing unit, receiving an instruction associated with a packed sum of absolute differences operation using first and second operands, and performing the packed sum of differences operation using the first and second operands in a floating point execution unit coupled to the processing unit.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 7 is a block diagram illustrating bit assignments for a 32-bit single precision floating point number.

FIG. 8 is a block diagram illustrating bit assignments for a 32-bit packed pixel value for use in the processing unit of FIG. 5 in connection with performing a packed sum of absolute differences operation consistent with the invention.

DETAILED DESCRIPTION

Embodiments consistent with the invention provide support for packed sum of absolute differences operations in a floating point execution unit. The floating point execution unit may be configured to perform a packed sum of absolute differences operation in response to a dedicated packed sum of absolute differences instruction defined in an instruction set for a processing unit, e.g., within the Power architecture VMX128 instruction set, and may perform such an operation in a single pass through a pipeline defined in the floating point execution unit. The floating point execution unit may be a scalar or vector floating point execution unit, and may support registers, and thus operands, of different sizes.

For example, in some embodiments of the invention, packed sum of absolute differences support may be added to an existing vector floating point execution unit in a processing unit by utilizing existing adders in the exponent calculation logic of each floating point lane, along with additional multiplexors and minimal additional logic for performing an absolute difference operation in each lane in parallel. The sums may then pass through existing compressors and added by existing floating point lane floating point adders in the vector floating point execution unit. The respective results may then be processed by an existing dot product adder in the vector floating point execution unit to yield a final sum. In many embodiments, the additional logic area added to the existing vector floating point unit will be orders of magnitude less than the additional area imposed by adding a full vector fixed point execution unit, resulting in a design with improved performance for applications such as image recognition algorithms or image encoding algorithms that utilize packed sum of absolute differences operations, while maintaining existing performance, cost, and power consumption. It will be appreciated, however, that the invention is not limited to the particular vector floating point execution unit configuration disclosed herein.

Other variations and modifications will be apparent to one of ordinary skill in the art. Therefore, the invention is not limited to the specific implementations discussed herein.

Hardware and Software Environment

Figure 1:
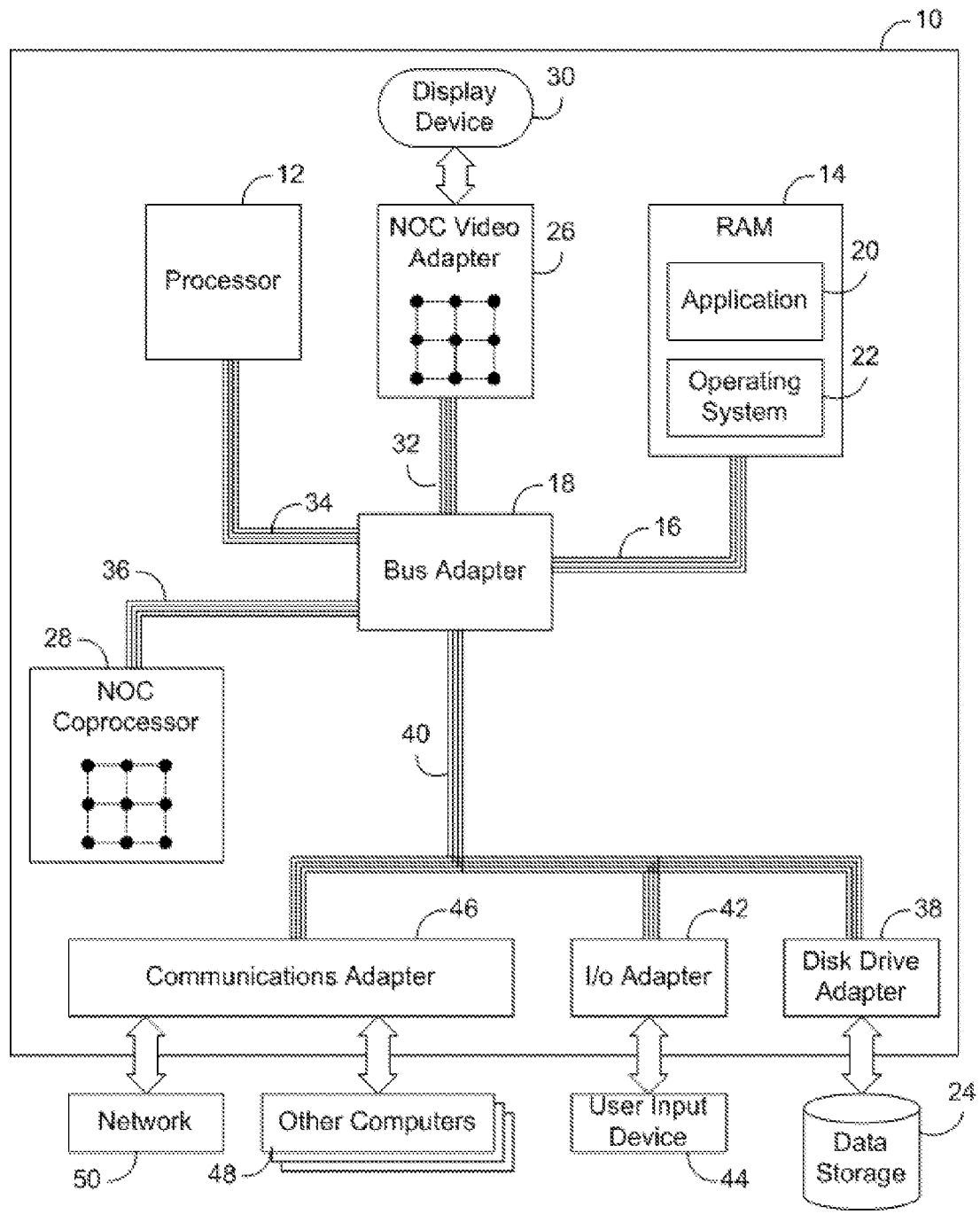
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™ Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
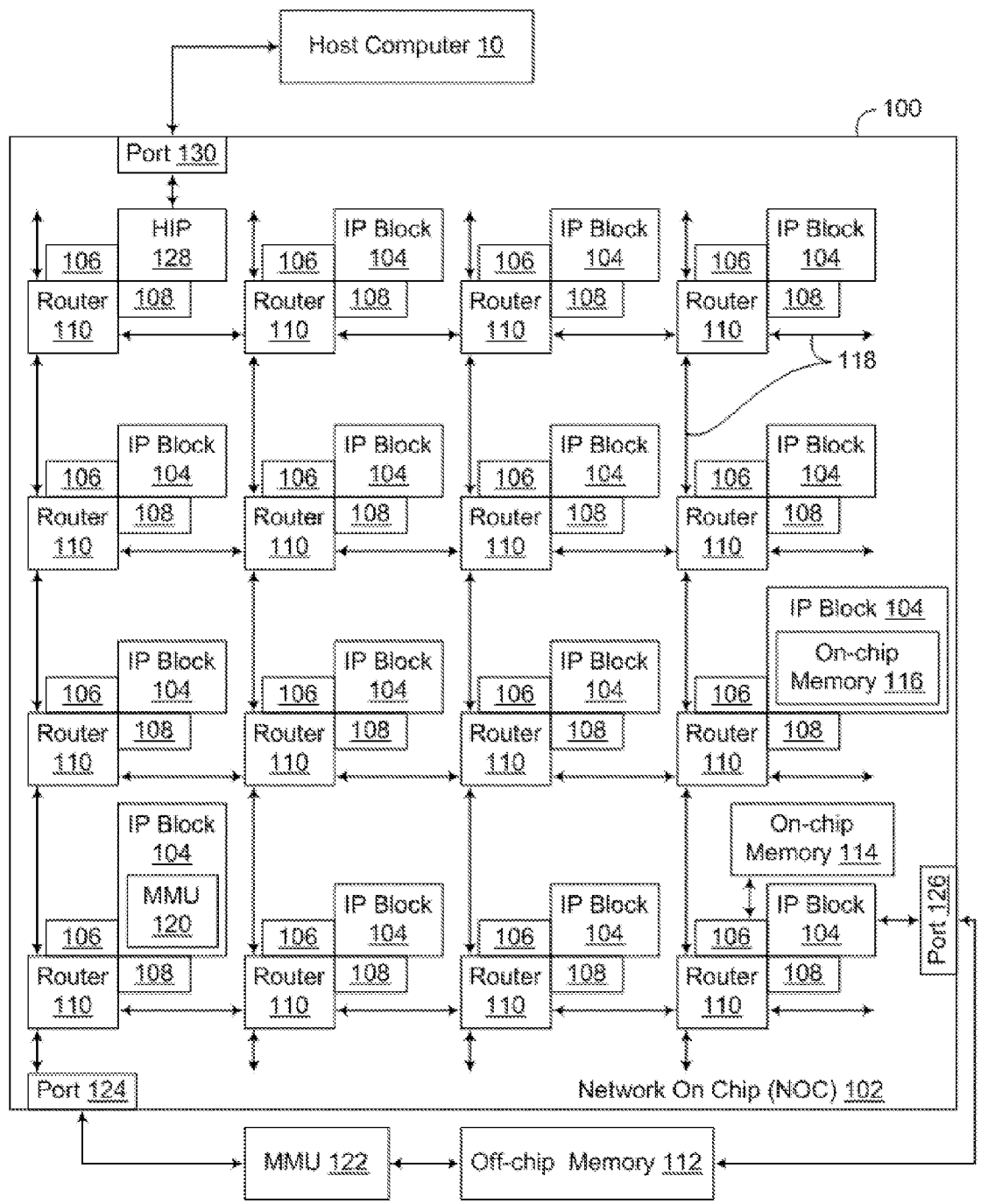
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and non-volatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
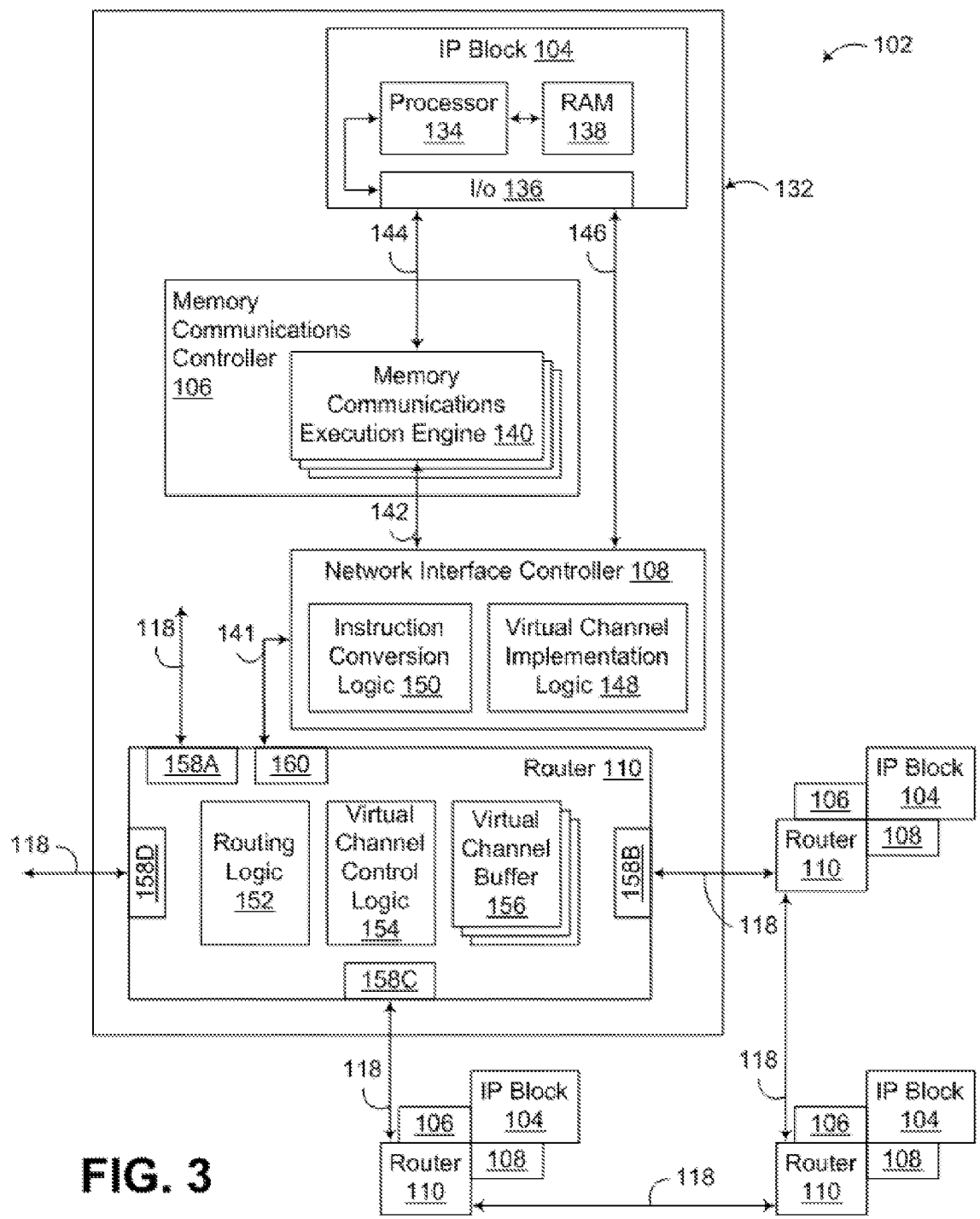
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
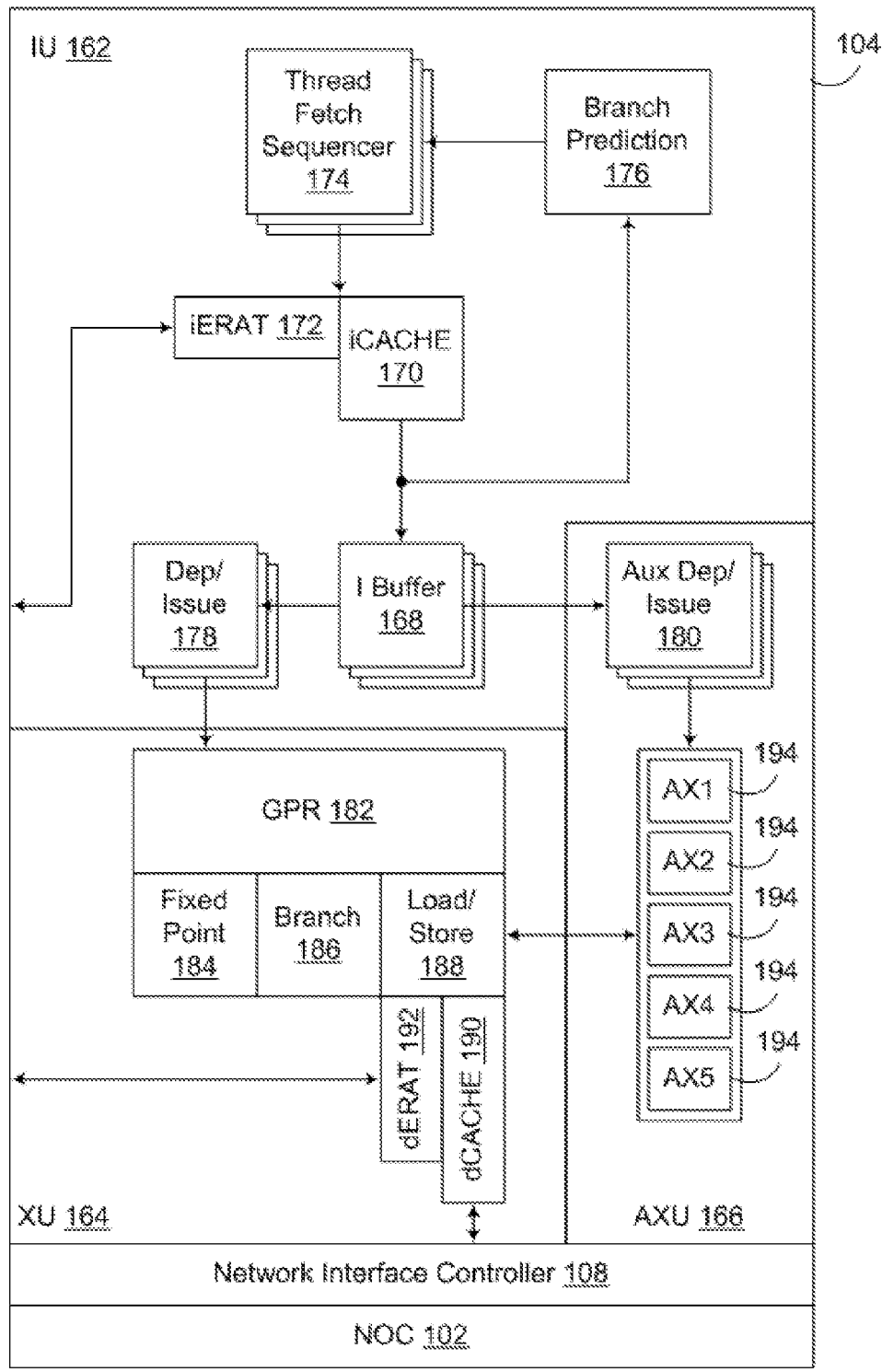
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an issue or instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Floating Point Execution Unit with Packed Sum of Absolute Differences Support

Figure 5:
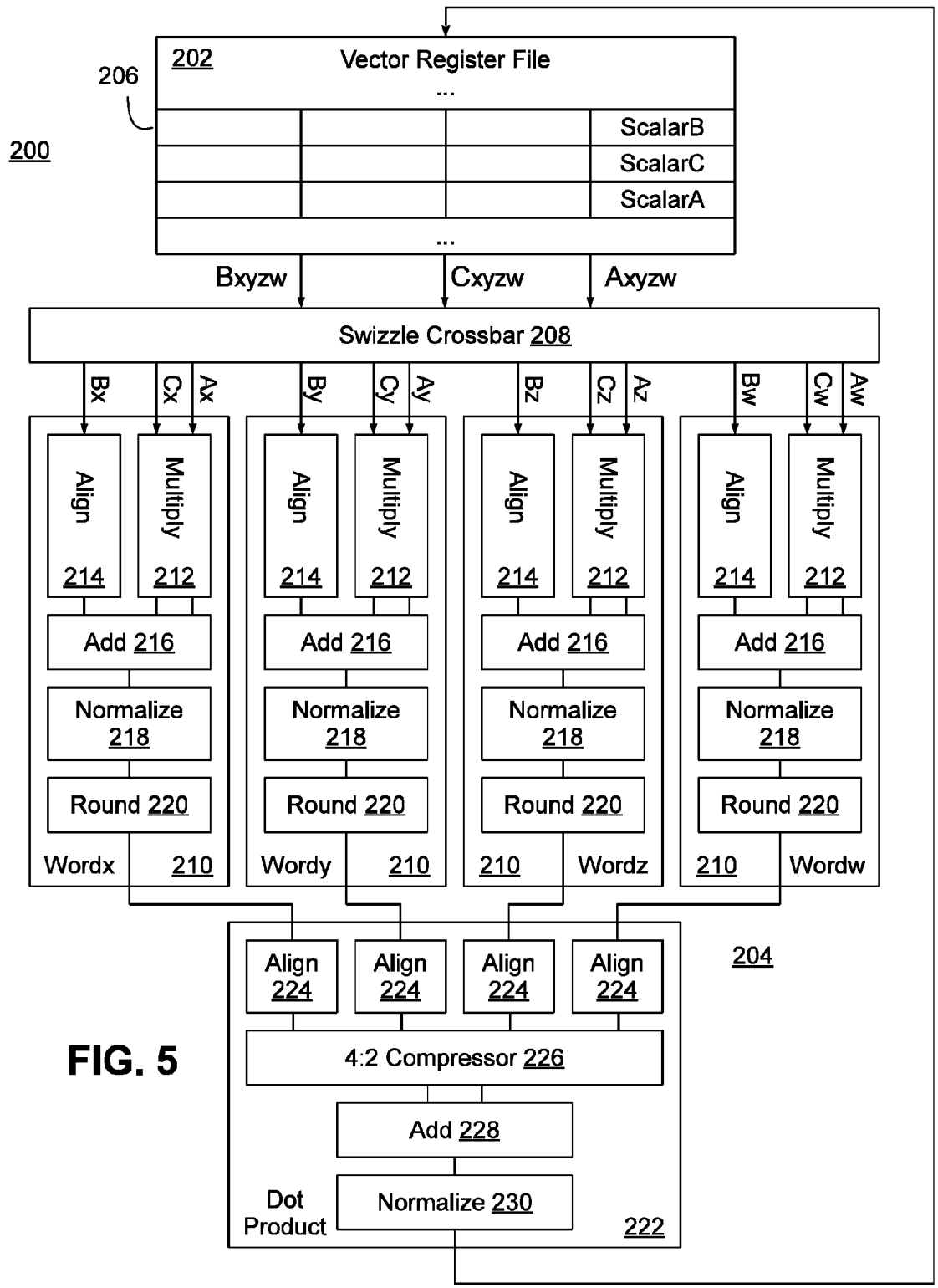
FIG. 5 is a block diagram of a processing unit incorporating a vector floating point execution unit consistent with the invention, and capable of being implemented within an IP block from the NOC of FIG. 2.

Turning now to FIG. 5, this figure illustrates an exemplary processing unit 200 incorporating a register file 202 and floating point execution unit 204 supporting packed sum of absolute differences operations consistent with the invention, e.g., for use in image recognition, image or video encoding, or other applications that utilize such operations. The processing unit may be implemented, for example, as a processor core in an IP block such as an IP block 104 from FIGS. 1-4. In the alternative, the processing unit may be implemented in other processor architectures that issue and execute instructions, including single or multi-core microprocessors or microcontrollers.

Floating point execution unit 204 is implemented as a vector floating point execution unit that receives floating point instructions from issue logic (not shown in FIG. 5), which may support issuance of instructions from single or multiple threads, and which may include dependency logic for managing dependencies between instructions, in a manner generally understood in the art. When multiple execution units are supported, the issue logic may also be capable of issuing multiple instructions to the multiple execution units each cycle. In some embodiments, however, only one execution unit may be supported, and furthermore, in some embodiments multi-threaded issue of instructions may not be supported.

Floating point execution unit 204 includes a multi-stage execution pipeline capable of processing data stored in register file 202 based upon issued instructions, and storing target data back to the register file. Floating point execution unit 202 may be implemented as a number of different types of execution units, e.g., a generic floating point unit, or a specialized execution unit such as a graphics processing unit, encryption/decryption unit, coprocessor, XML processing unit, or other execution unit incorporating floating point functionality.

In the implementation illustrated in FIG. 5, for example, floating point execution unit 204 is implemented as a vector floating point execution unit, e.g., as might be used for image processing, which processes single instruction multiple data (SIMD) instructions. Register file 202 includes a plurality (e.g., 128) of vector registers 206, each including a plurality of words (e.g., four), respectively designated as words x, y, z and w. A plurality of register file inputs and outputs (not shown) are provided to write floating point values into selected registers and output the contents of selected registers to execution unit 204 for processing. A plurality of operand inputs, e.g., operand inputs A, B and C, are provided between register file 202 and floating point execution unit 204 to provide floating point vectors (designated as $A_{xyzw}$, $B_{xyzw}$ and $C_{xyzw}$) to the execution unit for processing. Floating point execution unit 204 may include a swizzle crossbar 208 for routing operand words between a plurality of processing lanes or sub-units 210 (e.g., four) capable of processing the operand data stored in vector registers 206 in register file 202 and storing target data back to a vector register 206 in register file 202.

Given the configuration of execution unit 204 as a floating point unit usable in image processing applications, each processing lane 210 is configured to process floating point instructions. While a wide variety of other floating point architectures may be used in the alternative, execution unit 204 includes a pipelined floating point execution architecture capable of operating on three vector operands, denoted A, B and C. For vector operations, four 32-bit word vectors are supported, with the words in each vector being denoted as x, y, z and w, and as such, each processing lane 210 receives three operand words, one from each vector. Thus, for example, for the processing lane 210 that processes the x word from each vector, the operands fed to that processing lane are denoted as Ax, Bx and Cx.

Each processing lane 210 is configured to perform an operation in parallel with one or more other processing lanes. For example, each processing lane may multiply a pair of operands to perform a cross product or dot product operation. By multiplying different pairs of operands in different processing lanes of the vector unit, vector operations may be performed faster and more efficiently.

Each processing lane 210 is also pipelined to further improve performance. Accordingly, each processing lane 210 includes a plurality of pipeline stages for performing one or more operations on the operands. For example, for a first stage, each processing lane may include a multiplier 212 for multiplying the A and C operands. In one embodiment of the invention, the multiplication of operands may be performed in a first stage of the pipeline as illustrated in FIG. 5.

Each processing lane 210 may also include an aligner 214 for aligning operand B with the product computed by multiplier 212, in parallel with the computation of the product. While alignment is shown in the same pipeline stage in FIG. 5, one skilled in the art will recognize that the multiplication and alignment may be performed in separate pipeline stages in other embodiments.

Each processing lane 210 may also include an adder 216 for adding two or more operands. In one embodiment (illustrated in FIG. 5), each adder 216 is configured to receive the product computed by multiplier 212 (output as a sum and carry), and add the product to the aligned operand output by aligner 214. Each adder 216 may also include leading zero anticipator circuitry. Therefore, each processing lane 210 may be configured to perform a multiply-add instruction. One skilled in the art will recognize that multiply-add instructions are frequently performed in vector operations. Therefore, by performing several multiply add instructions in parallel lanes, the efficiency of vector processing may be significantly improved.

Each vector processing lane 210 may also include a normalizing stage. Accordingly, a normalizer 218 may be provided in each processing lane. Normalizer 218 may be configured to represent a computed value in a convenient exponential format. For example, normalizer 218 may receive the value 0.0000063 as a result of an operation. Normalizer 218 may convert the value into a more suitable exponential format, for example, $6.3 \times 10^{-6}$. A rounding stage, including a rounder 220, may also be provided to round a computed value to a desired number of decimal points.

For the purposes of dot product calculations, execution unit 204 also includes dot product logic 222 including four aligners 224, each coupled to a respective processing lane 210, a 4:2 compressor 226, an adder 228 and normalizer 230 that collectively sum the outputs of the four processing lanes 218 to generate a scalar result value. The output of normalizer 230 is provided as target data, which is written to a destination register in register file 202.

One skilled in the art will recognize that embodiments of the invention are not limited to the particular pipeline stages, components, and arrangement of components described above and in FIG. 5. For example, in some embodiments, each aligner 214 may be configured to align operand B, a product computed by multiplier 212, or both. Furthermore, embodiments of the invention are not limited to the particular components described in FIG. 5. Any combination of the illustrated components and additional components such as, but not limited to, leading zero anticipators, dividers, etc., which may be required to process other types of instructions supported by the floating point execution unit, may be included in each processing lane 210 consistent with the invention.

Figure 6:
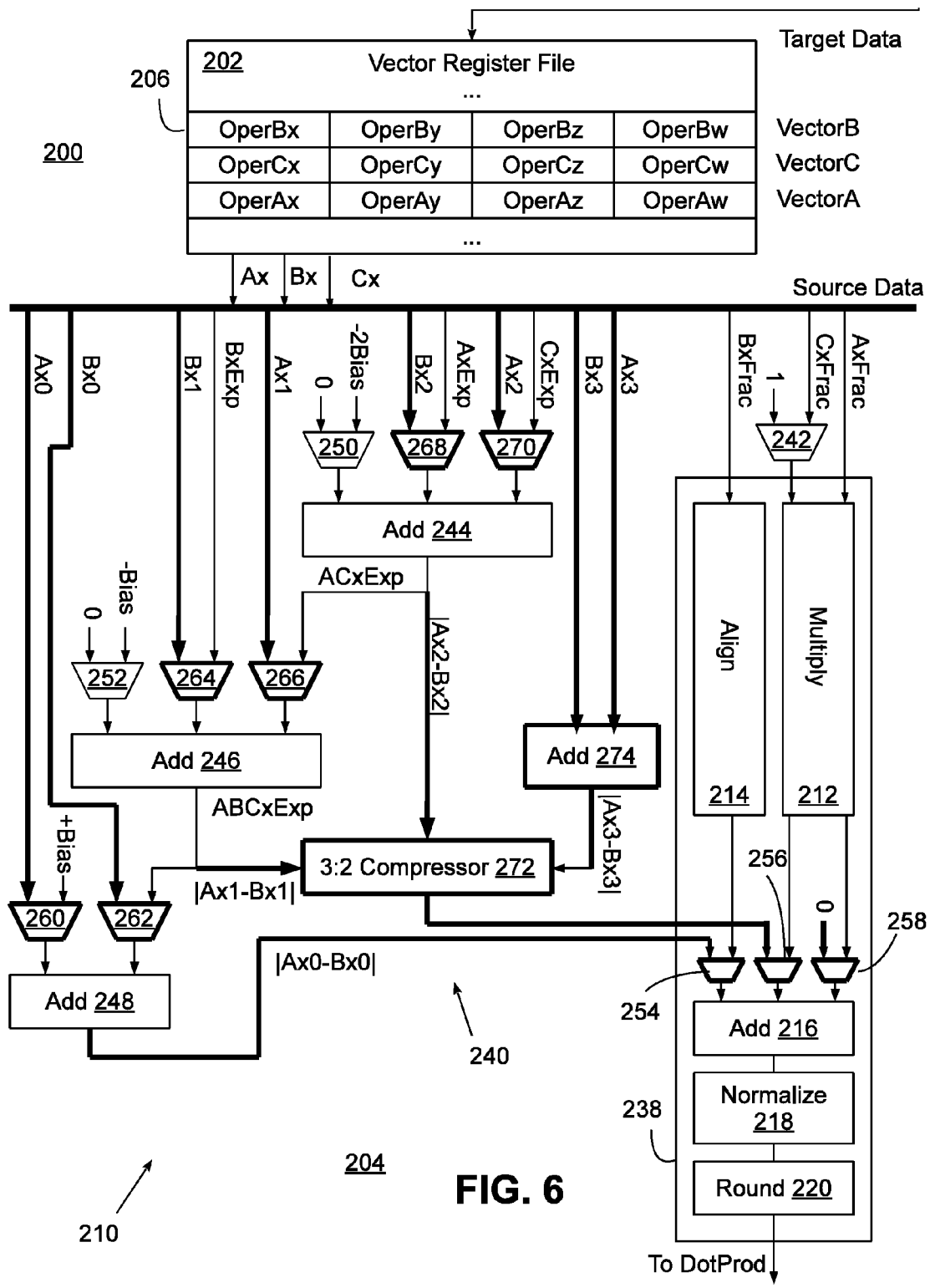
FIG. 6 is a block diagram of a processing lane from the vector floating point execution unit of FIG. 5, and illustrating additional logic utilized to support a packed sum of absolute differences operation consistent with the invention.

FIG. 5 illustrates the principal components utilized to process vector floating point instructions in vector floating point execution unit 204. Furthermore, in order to provide support for packed sum of absolute differences operations, vector floating point execution unit 204 may be provided with additional logic as illustrated in FIG. 6. As will become more apparent below, this additional logic may be relatively modest in size and complexity, particularly compared to implementing a separate vector fixed point execution unit to implement packed sum of absolute differences operations.

FIG. 6, in particular, illustrates a single processing lane 210, corresponding to the x words (Ax, Bx and Cx) of the operand vectors A, B and C. The additional logic incorporated into this processing lane to provide support for packed sum of absolute differences operations is illustrated in bolded lines to distinguish from other logic that is typically found in a vector floating point execution unit. It will be appreciated that the processing lanes for the y, z and w words may be similarly configured.

Each processing lane 210 typically includes fractional logic, illustrated at 238, and exponential logic, illustrated at 240. For example, a 32-bit single precision floating point number typically includes one sign bit, eight exponent bits and 23 significand bits (see FIG. 7), such that fractional logic 240 handles the significand calculations and exponential logic 238 handles the exponent calculations.

First, for fractional logic 238, the aforementioned multiplier 212, aligner 214, adder 216, normalizer 218 and rounder 220 components are provided, with the fractional portions of the Ax and Bx operands (AxFrac and BxFrac) respectively passed to multiplier 212 and aligner 214. In addition, a multiplexer 242 is provided to pass either the fractional portion of the Cx operand (CxFrac) or a value of "1," e.g., for use in operations where no multiplication is required.

Second, for exponential logic 240, a series of adders 244, 246 and 248 are primarily used to compute the exponent portion of a floating point result value. Adder 244 is typically referred to as a multiply exponent adder that is used to add the exponents of the operands being multiplied, i.e., operands A and C. For floating point operations, adder 244 adds together the A and C exponents (labeled in FIG. 6 as AxExp and CxExp) along with either a value of "0" or "−2Bias" selected by a multiplexer 250. The output of adder 244, denoted as ACxExp, is then fed to adder 246, which is typically referred to as a B operand exponent unbiasing adder, and which adds to the output of adder 244 the exponent of operand B (BxExp) and either a value of "0" or "−Bias" selected by a multiplexer 252. This output is then fed to adder 248, which is typically referred to as a result exponent rebiasing adder, which adds a positive bias ("+Bias") to the output of adder 246 prior to writing the result back to the register file.

To support packed sum of absolute differences operations, only two operand vectors A, B are used (a third operand vector C is not required). Each 32-bit operand word in each operand vector may be configured as illustrated in FIG. 8, where operand word Ax of operand vector A is broken into four 8-bit fields Ax0, Ax1, Ax2 and Ax3, e.g., corresponding respectively to the red, green, blue and alpha channels of an R8G8B8A8 pixel format. Likewise, returning to FIG. 6, for operand word Bx, the 8-bit fields Bx0, Bx1, Bx2 and Bx3 are defined.

For fractional logic 238, packed sum of absolute differences operations may be supported by adding three multiplexers 254, 256 and 258. Likewise, for exponential logic 40, packed sum of absolute differences operations may be supported by adding multiplexers 260, 262, 265, 266, 268 and 270, a 3:2 compressor 272 and an adder 274. For the purposes of simplifying the discussion hereinafter, the left input of each multiplexer 254-270 is selected whenever a packed sum of absolute differences operation is performed, while the right input is selected whenever floating point operations are performed. It will be appreciated, however, that different multiplexer inputs for each multiplexer may be used for each of these modes in other embodiments of the invention.

Multiplexer 254 is interposed between the output of aligner 214 and one input of adder 216, and includes, as the left input, the output of adder 248. Multiplexers 256 and 258 are interposed between multiplier 212 and adder 216, with one of multiplexers 256, 258 receiving in the right input the sum output of multiplier 212, and the other receiving in the right input the carry output of multiplier 212 (in many embodiments, which multiplexer receives the sum, and which receives the carry, is immaterial). Multiplexer 256 includes, as the left input, the output of 3:2 compressor 272, while the left input to multiplexer 258 is a "0" value, which effectively disables this input of adder 216.

For exponential logic 240, result exponent rebiasing adder 248 is repurposed to determine the absolute difference between the Ax0 and Bx0 fields of operand words Ax and Bx through the addition of multiplexers 260, 262. Multiplexer 260 feeds one input of adder 248 and switches between either +Bias (used for rebiasing) or Ax0. Multiplexer 262 feeds the other input of adder 248 and switches between either the output of adder 246 or Bx0, such that when processing floating point operations, multiplexers 260, 262 cause adder 248 to sum ABCxExp, the output of adder 246, with Bias+. However, when processing packed sum of absolute differences operations, multiplexers 260, 262 cause adder 248 to calculate the absolute difference between Ax0 and Bx0 (|Ax0−Bx0|).

B operand exponent unbiasing adder 246 is repurposed to determine the absolute difference between the Ax1 and Bx1 fields of operand words Ax and Bx through the addition of multiplexers 264, 266. Multiplexer 264 feeds one input of adder 246 and switches between either the exponent portion of the Bx operand (BxExp) or Bx1. Multiplexer 266 feeds another input of adder 246 and switches between either the output of adder 244 or Ax1, such that when processing floating point operations, multiplexers 264, 266 cause adder 246 to sum BxExp with ACxExp, the output of adder 244, and either a value of "0" or "−Bias," selected by multiplexer 252. However, when processing packed sum of absolute differences operations, multiplexers 264, 266 cause adder 246 to calculate the absolute difference between Ax1 and Bx1 (|Ax1−Bx1|). Of note, multiplexer 252 is also used to select the "0" input so as to not affect the calculation.

Multiply exponent adder 244 is repurposed to determine the absolute difference between the Ax2 and Bx2 fields of operand words Ax and Bx through the addition of multiplexers 268, 270. Multiplexer 268 feeds one input of adder 244 and switches between either the exponent portion of the Ax operand (AxExp) or Bx2. Multiplexer 270 feeds another input of adder 244 and switches between either the exponent portion of the Cx operand (CxExp) or Ax2, such that when processing floating point operations, multiplexers 268, 270 cause adder 244 to sum AxExp with CxExp, and either a value of "0" or "−2Bias," selected by multiplexer 250. However, when processing packed sum of absolute differences operations, multiplexers 268, 270 cause adder 244 to calculate the absolute difference between Ax2 and Bx2 (|Ax2−Bx2|). Of note, multiplexer 250 is also used to select the "0" input so as to not affect the calculation.

The outputs of adders 244, 246 are also passed to two inputs of a 3:2 compressor. The third input to the 3:2 compressor is fed by an adder 274, which determines the absolute difference between the Ax3 and Bx3 fields of operand words Ax and Bx (|Ax3−Bx3|). Given that, when processing packed sum of absolute differences operations, adders 244 and 246 respectively output the absolute differences |Ax2+Bx2| and |Ax1+Bx1|, 3:2 compressor 272 effectively operates as an adder to sum together |Ax1−Bx1|, |Ax2−Bx2|, |Ax3−Bx3|. This sum is then provided to multiplexer 256 in fractional logic 238.

The absolute difference |Ax0−Bx0|, calculated by adder 248, is provided to multiplexer 254 in fractional logic 238, and as a result, when processing packed sum of absolute differences operations, adder 216 is repurposed to sum the outputs of adder 248 and 3:2 compressor 272, resulting in a sum of absolute differences between operand words Ax and Bx being calculated as:

$$|Ax0-Bx0|+|Ax1-Bx1|+|Ax2-Bx2|+|Ax3-Bx3|$$

It will be appreciated that various techniques, which would be appreciated by one of ordinary skill in the art having the benefit of the instant disclosure, may be used in order to calculate an absolute difference using each of adders 244, 246, 248 and 274. For example, a subtract mode may be used to configure an adder to subtract, rather than add, two inputs. Alternatively, an inverter may be included to negate one of the inputs to thereby sum one input with the negative of the other input. In addition, to calculate an absolute value of the difference generated by an adder, the sign bit of the output of the adder may be forced to zero or ignored.

In addition, various alternate techniques, which would be appreciated by one of ordinary skill in the art having the benefit of the instant disclosure, may be used to sum together absolute difference calculations. For example, a 4:2 compressor may be used in lieu of a 3:2 compressor. In addition, different fields Ax0-Ax3, Bx0-Bx3 may be processed by adders 244-248 and 274, and alternate adder inputs may be used in some embodiments. Further, modifications may be made to adder 216 to support the addition of different numbers of partial calculations. In short, a wide variety of other modifications may be made to a floating point execution unit to provide support for packed sum of absolute differences operations without departing from the spirit and scope of the invention.

Returning briefly to FIG. 5, once each processing lane 210 calculates a packed sum of absolute differences between two operand words (e.g., Ax and Bx), the outputs of all four lanes 210 are summed together using dot product logic 222, in a manner that would be apparent to one of ordinary skill in the art having the benefit of the instant disclosure.

Thus, assuming 128-bit vectors with four 32-bit words, each processing lane 210 may perform four parallel 8-bit absolute difference operations, with a total of 16 8-bit absolute difference operations being performed by the four processing lanes operating in parallel and in a single pass through the floating point execution unit. Consequently, for packed 32-bit pixels in the R8G8B8A8 format, four packed sum of absolute differences operations may be performed in parallel, thereby enabling, for example, four pixels to be compared to a mask in parallel. In contrast, with a conventional floating point execution unit, each color channel would consume a different floating point processing lane, such that only one pixel could be compared in each pass, and as such a 4× performance improvement would be realized in embodiments consistent with the invention. Furthermore, for monochrome or reduced color depth images where only 8 bits are used for each pixel, each processing lane may operate on four pixels at a time, thereby enabling a total of 16 pixels to be compared to a mask in a single vectorized operation, as compared to a conventional floating point execution unit that could process at most four pixels at a time.

In the illustrated embodiments, one or more specific instruction types in the instruction set supported by processing unit 200 may be dedicated to performing packed sum of absolute differences operations. Decode logic disposed within processing unit 200, in response to receiving an instruction in an instruction stream that matches the dedicated instruction type, may be used to configure the aforementioned logic in vector floating point execution unit 204 to operate in a packed sum of absolute differences mode and perform the desired calculation.

Therefore, embodiments consistent with the invention may be used to repurpose floating point execution unit logic, e.g., in a scalar or vector floating point execution unit, to perform packed sum of absolute differences operations. In many embodiments, this may permit a processor architecture to omit a separate vector fixed point execution unit, thereby saving circuit area, costs and power consumption, while still providing high performance packed sum of absolute differences operations.

Various additional modifications may be made to the disclosed embodiments without departing from the spirit and scope of the invention. For example, as noted above, support for packed sum of absolute differences operations may be implemented in a scalar floating point execution unit rather than a vector floating point execution unit, e.g., where only a single instance of processing lane 210 of FIG. 6 is used in the scalar floating point execution unit. Therefore, the invention lies in the claims hereinafter appended.

What is claimed is:

1. A method of performing a packed sum of absolute differences operation, the method comprising:
   in a processing unit, receiving an instruction associated with a packed sum of absolute differences operation using first and second operands; and
   performing the packed sum of differences operation using the first and second operands in a floating point execution unit coupled to the processing unit, wherein the floating point execution unit includes exponential logic configured to perform an exponent calculation associated with a floating point operation and fractional logic configured to perform a significand calculation associated with the floating point operation, and wherein performing the packed sum of differences operation includes performing at least one absolute difference calculation for the packed sum of absolute differences operation using the exponential logic and performing at least one absolute difference calculation for the packed sum of absolute differences operation using the fractional logic.

2. The method of claim 1, wherein the floating point execution unit performs the packed sum of absolute differences operation in a single pass.

3. The method of claim 1, wherein the processing unit does not include a vector fixed point execution unit.

4. The method of claim 1, wherein the floating point execution unit is a vector floating point execution unit including a plurality of processing lanes, wherein each of the first and second operands includes a plurality of operand words, and wherein each of the processing lanes performs at least one packed sum of absolute differences operation between corresponding operand words in the first and second operands.

5. The method of claim 4, wherein each operand word includes 32 bits of pixel data in an 8R8B8G8A format, wherein each operand includes four words, wherein the vector floating point execution unit includes four processing lanes, and wherein the vector floating point execution unit is configured to perform four packed sum of absolute differences operations in parallel.

6. The method of claim 4, wherein each operand word includes four 8-bit pixels, wherein each operand includes four words, wherein the vector floating point execution unit includes four processing lanes, and wherein the vector floating point execution unit is configured to perform sixteen packed sum of absolute differences operations in parallel.

7. The method of claim 1, wherein the floating point execution unit includes at least one multiplexer that repurposes the exponential logic to perform at least one absolute difference calculation for the packed sum of absolute differences operation.

8. The method of claim 7, wherein the exponential logic includes at least one adder configured to perform an addition operation with an exponent of a floating point operand when performing the floating point operation, and wherein the at least one multiplexer includes a first multiplexer having an output coupled to an input of the adder, the first multiplexer including first and second inputs, the first input configured to receive the exponent from the floating point operand and the second input configured to receive at least a portion of the first operand associated with the instruction, wherein the multiplexer is configured to pass the exponent from the floating point operand to the adder when performing the floating point operation, and pass the portion of the first operand to the adder when performing the packed sum of absolute differences operation.

9. The method of claim 7, wherein the exponential logic includes a multiply exponent adder, wherein the at least one multiplexer includes first and second multiplexers coupled to the multiply exponent adder, the first multiplexer configured to select between an exponent of a first floating point operand and a first portion of the first operand associated with the instruction, and the second multiplexer configured to select between an exponent of a second floating point operand and a first portion of the second operand associated with the instruction.

10. The method of claim 9, wherein the exponential logic further includes an operand exponent unbiasing adder, wherein the at least one multiplexer further includes third and fourth multiplexers coupled to the operand exponent unbiasing adder, the third multiplexer configured to select between an exponent of a third floating point operand and a second portion of one of the first and second operands associated with the instruction, and the fourth multiplexer configured to select between an output of the multiply exponent adder and a second portion of an other of the first and second operands associated with the instruction.

11. The method of claim 10, wherein the exponential logic further includes a result exponent rebiasing adder, wherein the at least one multiplexer further includes fifth and sixth multiplexers coupled to the result exponent rebiasing adder, the fifth multiplexer configured to select between a bias and a third portion of one of the first and second operands associated with the instruction, and the sixth multiplexer configured to select between an output of the operand exponent unbiasing adder and a third portion of an other of the first and second operands associated with the instruction.

12. The method of claim 11, wherein the exponential logic further includes a fourth adder configured to receive fourth portions of the first and second operands associated with the instruction, and wherein each of the multiply exponent adder, operand exponent unbiasing adder, result exponent rebiasing adder, and fourth adder is configured to calculate an absolute difference between the respective first, second, third and fourth portions of the first and second operands associated with the instruction.

13. The method of claim 12, wherein the floating point execution unit is further configured to sum the absolute differences calculated by the multiply exponent adder, operand exponent unbiasing adder, result exponent rebiasing adder, and fourth adder.

14. The method of claim 13, wherein the exponential logic further includes a compressor configured to receive at least three absolute differences calculated by at least a subset of the multiply exponent adder, operand exponent unbiasing adder, result exponent rebiasing adder, and fourth adder.

15. The method of claim 14, wherein the fractional logic includes at least one adder, and wherein the floating point execution unit includes at least one multiplexer coupled to an input of the adder and configured to repurpose the adder in the fractional logic to sum an output of the compressor with at least one absolute difference calculated by the exponential logic.

16. The method of claim 1, wherein the instruction is a packed sum of absolute differences instruction defined in an instruction set for the processing unit.

17. The method of claim 1, wherein the floating point execution unit includes at least one multiplexer configured to repurpose the fractional logic to perform at least a portion of the packed sum of absolute differences operation.

18. The method of claim 1, wherein the first and second operands are respectively stored in first and second registers in a register file, and wherein the instruction identifies the first and second registers.

\* \* \* \* \*